US010066801B1

(12) United States Patent
Rice et al.

(10) Patent No.: US 10,066,801 B1
(45) Date of Patent: Sep. 4, 2018

(54) VEHICLE LAMP REFLECTOR HAVING VENTILATION CHANNEL ADJACENT LAMP CAPSULE

(71) Applicants: Lawrence Rice, Hillsboro, NH (US); Elizabeth Czech, Amherst, NH (US); Thomas Tessnow, Weare, NH (US)

(72) Inventors: Lawrence Rice, Hillsboro, NH (US); Elizabeth Czech, Amherst, NH (US); Thomas Tessnow, Weare, NH (US)

(73) Assignee: OSRAM SYLVANIA Inc., Wilmington, MA (US)

(*) Notice: Subject to any disclaimer, the term of this patent is extended or adjusted under 35 U.S.C. 154(b) by 0 days.

(21) Appl. No.: 15/724,843

(22) Filed: Oct. 4, 2017

(51) Int. Cl.

| | |
|---|---|
| ***B60Q 1/00*** | (2006.01) |
| ***F21S 41/19*** | (2018.01) |
| ***F21S 8/10*** | (2006.01) |
| ***F21S 45/49*** | (2018.01) |
| ***F21S 41/255*** | (2018.01) |
| ***F21S 41/166*** | (2018.01) |
| *F21S 41/33* | (2018.01) |
| *F21S 45/43* | (2018.01) |

(52) U.S. Cl.

CPC ........... *F21S 41/192* (2018.01); *F21S 41/166* (2018.01); *F21S 41/194* (2018.01); *F21S 41/255* (2018.01); *F21S 45/49* (2018.01); *F21S 48/1109* (2013.01); *F21S 48/1113* (2013.01); *F21S 48/1177* (2013.01); *F21S 48/1258* (2013.01); *F21S 48/321* (2013.01); *F21S 41/338* (2018.01); *F21S 45/43* (2018.01); *F21S 48/1382* (2013.01); *F21S 48/325* (2013.01)

(58) Field of Classification Search

CPC ........ F21S 41/166; F21S 41/19; F21S 41/192; F21S 41/194; F21S 41/196; F21S 41/198; F21S 41/255; F21S 41/30; F21S 41/32; F21S 41/321; F21S 41/338; F21S 45/30; F21S 45/33; F21S 45/37; F21S 45/40; F21S 45/42; F21S 45/435; F21S 45/49

USPC ......................... 362/507, 516, 519, 547–548

See application file for complete search history.

(56) References Cited

U.S. PATENT DOCUMENTS

| | | | |
|---|---|---|---|
| 4,507,712 | A | 3/1985 | Dolan |
| 4,564,891 | A | 1/1986 | Daumüller |

(Continued)

FOREIGN PATENT DOCUMENTS

| | | | |
|---|---|---|---|
| EP | 0 463 503 | A1 | 1/1992 |
| EP | 1 437 546 | A2 | 7/2004 |

OTHER PUBLICATIONS

Excerpt of SAE (Society of Automotive Engineers) Tech. Spec. J2560, issued Jul. 2007 (pp. 41-56).

*Primary Examiner* — Jason Moon Han

(74) *Attorney, Agent, or Firm* — Edward S. Podszus

(57) ABSTRACT

A headlamp reflector 12, which accepts a conventional lamp capsule 10 having a sealing gasket 64, has a neck 2 defining a bore 40 and socket 50 to receive and retain lamp capsule 10 with capsule latching structure 52. Reflector neck 2 has a gasket seating surface 47 adjacent to which one or more recessed channels 43 are formed which define air passageways 70 that communicate between inner reflector cavity 19 and neck entrance region 46, allowing air passage past gasket 64 with capsule 10 retained in socket 50, while still allowing gasket 64 to position capsule 10 in reflector bore 40. Gasket seating surface 47 may be located displaced axially from capsule latching structure 52. Embodiments of reflector 12 accommodate a variety of popular, commercially available replaceable lamp capsules 10.

17 Claims, 14 Drawing Sheets

(56) References Cited

U.S. PATENT DOCUMENTS

| | | | |
|---|---|---|---|
| 4,609,977 | A | 9/1986 | Eckhardt |
| 4,622,486 | A | 11/1986 | Endo |
| 4,862,337 | A | 8/1989 | Ohshio |
| 4,890,202 | A | 12/1989 | Blanche |
| 5,010,455 | A | 4/1991 | Luallin |
| 5,041,955 | A | 8/1991 | Devir |
| 5,088,011 | A | 2/1992 | Williams |
| 5,121,304 | A | 6/1992 | Hall |
| 5,406,467 | A | 4/1995 | Hashemi |
| 5,457,616 | A | 10/1995 | Grigorescu |
| 5,618,097 | A | 4/1997 | Coushaine |
| 5,839,818 | A | 11/1998 | Janson |
| 5,855,430 | A | 1/1999 | Coushaine |
| 5,897,196 | A | 4/1999 | Soskind et al. |
| 5,938,323 | A | 8/1999 | McMahan |
| 6,005,336 | A | 12/1999 | Helbig et al. |
| 6,071,000 | A | 6/2000 | Rapp |
| 6,080,019 | A | 6/2000 | Coushaine |
| 6,082,883 | A | 7/2000 | Tatsumi et al. |
| 7,261,451 | B2 | 8/2007 | Coushaine et al. |
| 7,427,152 | B2 | 9/2008 | Erion |
| 9,151,459 | B2 | 10/2015 | Wilson |
| 2008/0117647 | A1 | 5/2008 | Behr et al. |
| 2014/0085921 | A1 | 3/2014 | Petker |
| 2014/0334170 | A1 | 11/2014 | Zhong et al. |

VEHICLE LAMP REFLECTOR HAVING VENTILATION CHANNEL ADJACENT LAMP CAPSULE

CROSS REFERENCE TO RELATED APPLICATIONS

N/A

TECHNICAL FIELD

The present disclosure relates to cooling light sources for a motor vehicle, particularly automotive headlamps having a light source formed as a replaceable lamp capsule received at a reflector socket.

BACKGROUND

It is known that automobile headlamps operate in a hot environment within a contained space defined within a headlamp cavity, where air may be constrained between a cover lens and a lamp reflector in which a heat-generating, e.g. incandescent, lamp capsule is mounted. Lamp reflectors are often made of metallized plastics that must withstand elevated temperature, and lamp capsules are made with bases made of heat-resistant plastics, because it is known that in operation an incandescent, e.g. halogen, lamp can reach temperatures of 240 degrees C., as known in column 3 of U.S. Pat. No. 4,609,977 (Eckhardt), which is incorporated by reference in its entirety as if fully set forth herein. Certain plastics used in the headlamp system may degrade due to elevated temperatures. Degraded plastics may cause outgassing which can disadvantageously result in a haze of plastics material being deposited on the reflector optical surface or the front lens, thereby decreasing headlamp efficiency. In operation, it is desired to maintain a temperature, as measured on the lamp capsule bulb wall radially above the filament and corresponding to the capsule's hot spot, not in excess of a maximum temperature of 650 degrees C. It is advantageous to promote a cooling airflow to the reflector cavity.

Simply adding vents in the reflector surface would impair photometric performance. It has been proposed to provide cooling holes in headlamp reflectors, but these disadvantageously put holes in the optical surface and could reduce optical efficiency, see U.S. Pat. No. 6,071,000 (Rapp) and U.S. Pat. No. 5,406,467 (Hashemi). Other proposals add forced air fans rather than passive cooling, adding to component cost, complexity and electrical power load, see U.S. Pat. No. 7,427,152 (Erion) or European Specification EP 1 437 546 (Nolte). Another ventilation proposal is to guide air above the lamp base through the lamp hole which receives the capsule in the reflector, see U.S. Pat. No. 5,457,616 (Grigorescu), requiring a specially modified reflector rear with standoff skirts (22, 24, 26) that, in cooperation with a special cover adaptor (30) clipped to the reflector rear and which holds the lamp capsule, define a radially oriented, planar, sinuous labyrinthine pathway (FIG. 2) intended to pass air but block water, the pathway located axially forward of, and separated from, both the capsule retaining collar (30e, 30f) and the capsule seal gasket (12).

Conventional headlamp capsules, illustrated in U.S. Pat. No. 6,080,019 (Coushaine), U.S. Pat. No. 7,261,451 (Coushaine), and U.S. Pat. No. 5,855,430 (Coushaine) of the present Applicant's assignee, are known, and are each incorporated here in their entirety as if fully set forth herein. Commercial embodiments of such headlamp capsules as seen at Coushaine Pat. '019 at FIGS. 1-5 are generally designated in the trade as, for example SAE type 9005 or 9006 capsules (also known as HB3 and HB4, respectively), which are generally L-shaped, and embodiments of FIGS. 6-12 (or at Coushaine Pat. '430 at FIG. 4) are generally designated in the trade as, for example SAE type 9008 (or H13), which are generally straight.

Other conventional capsule arrangements with a replaceable capsule sealed into a receiving region of a headlamp reflector are known in e.g. U.S. Pat. No. 9,151,459 (Wilson); U.S. Pat. No. 6,082,883 (Tatsumi); U.S. Pat. No. 4,862,337 (Ohshio); and Pub. US 2014/0085921 (Petker), and are understood to suffer thermal disadvantages of the prior art.

SUMMARY

In order to promote headlamp cooling the present Applicants herein proposed and recognized the benefit of a "leaky" capsule-receiving socket region at the reflector.

As shown in U.S. Pat. No. 7,261,451 (Coushaine) of the present Applicant's assignee, which is incorporated by reference in its entirety as if fully set forth herein, when a conventional lamp capsule of the 9005 type is received in a socket positioned in the neck of a headlamp reflector, a sealing gasket (e.g. 34 at FIG. 1) provides an environmental seal. This seal is understood by one of ordinary skill to be a "hermetic seal", as disclosed for example in U.S. Pat. No. 4,862,337 (Ohshio), which is incorporated by reference in its entirety as if fully set forth herein, at e.g. FIG. 21 and column 6, lines 9-15. It is further known in the aforementioned Coushaine Pat. '019 (e.g. column 3, ln. 28-29) and shown in Coushaine Pat. '430 (FIG. 1; col. 4, ln. 62) that a silicone rubber seal, also referred to as a gasket or O-ring, closes off the reflector passage. Accordingly, for example, the present Applicants herein recognized that when a conventional capsule, equipped with its gasket, is secured in the passageway of a conventional reflector, water can be poured into the reflector cavity when held upward like a concave dish and retained in the reflector, but that, on the other hand, however, when the gasket is removed, in a similar situation water dribbles past the capsule. The present Applicants herein conceived and considered omitting the conventional gasket (O-ring) of a 9005-type lamp, and further recognized that, in operation of such with the gasket removed, an acceptable, lower temperature could be maintained, due to sufficient airflow through the socket, to eliminate thermal difficulties of excessive temperature or outgas sing of plastics.

The present Applicants herein recognized, however, that conventional lamp capsules equipped with a gasket require the presence of the gasket. Commercial embodiments of such popular lamp capsules as the 9005 have overall envelope dimensions that are standardized in the industry and envision the seal being present on the capsule, such as set forth in SAE (Society of Automotive Engineers) Document J2560 at pages 41-56 (issued July 2007), which is incorporated hereby in its entirely as if fully set forth herein. Furthermore, the present Applicants herein appreciated that, to fulfill regulatory requirements, capsules are only approved for sale with a sealing gasket and they cannot then be offered to consumers as replacement parts, nor supplied in the vehicle headlamp by original equipment manufacturers (OEM), absent the seal (e.g. O-ring). Moreover, the present Applicants herein appreciated that the seal (e.g. O-ring) can also act to position the lamp (e.g. radially position) in the socket of the reflector thus ensuring proper filament position and so thus regulatory photometric performance.

In one embodiment, a reflector, which accepts a conventional lamp capsule that has a sealing gasket, has a reflector optical surface in the reflector cavity and a neck defining a bore which extends in an axial direction between a neck entrance region and a neck exit region, the neck exit region being proximate the optical surface. The neck entrance region is configured to accept the lamp capsule and opens to an exterior region exterior of the reflector. The reflector and/or neck has a socket region which receives the lamp capsule that is positioned in the bore, the socket region further having capsule latching structure to retain the lamp capsule. A gasket seating surface, located along the neck axially and which may be separated from the capsule latching structure, is adapted to receive the lamp gasket of the lamp capsule. The neck further defines at least one channel adjacent to and recessed relative the gasket seating surface of the neck, the at least one channel opening to the neck entrance region and thereby bounding, adjacent to the capsule gasket, an air passageway in fluid communication with the neck entrance region. Further embodiments and advantages are discussed hereinbelow.

BRIEF DESCRIPTION OF FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION INCLUDING BEST MODE OF A PREFERRED EMBODIMENT

Figure 1:
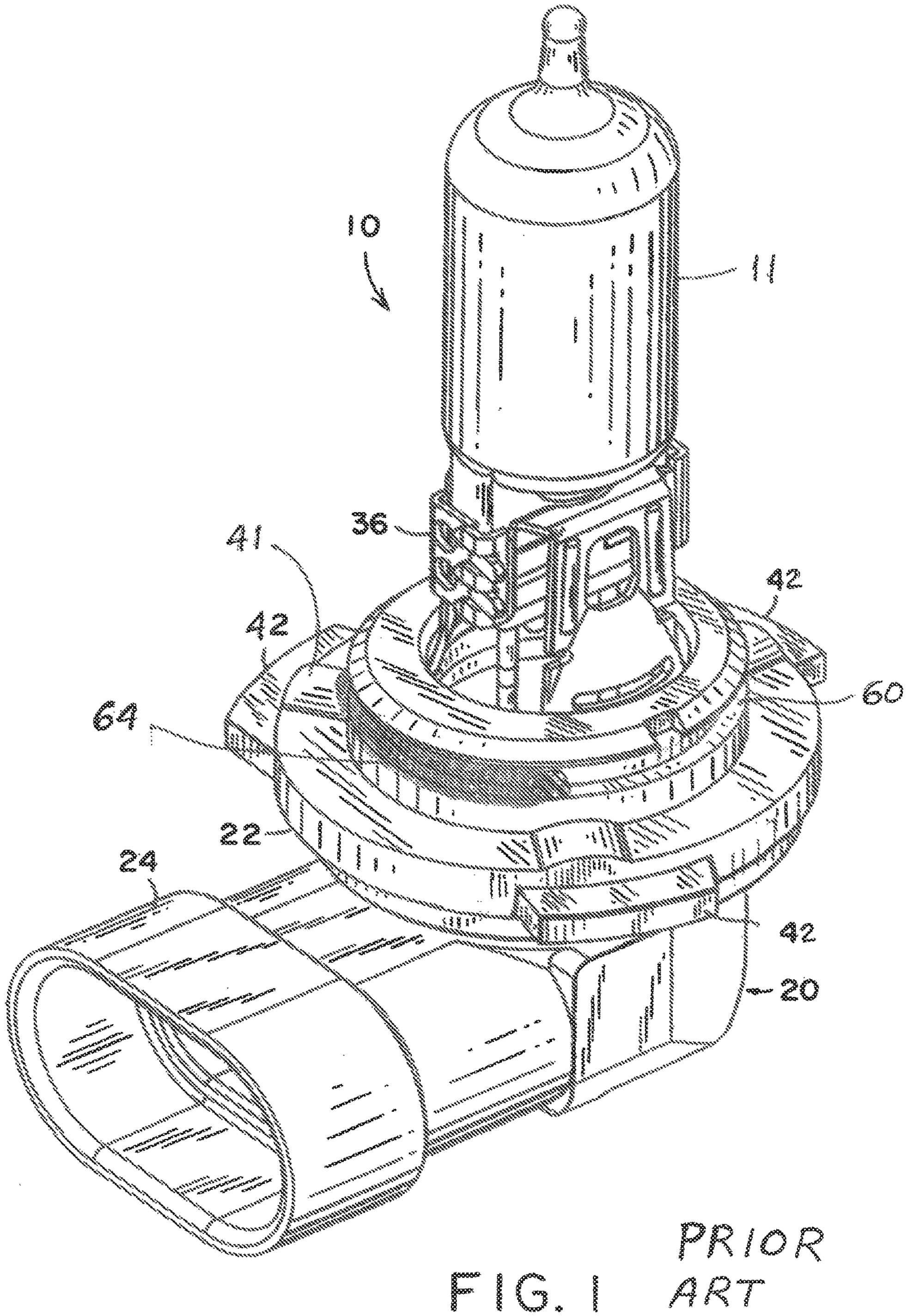
FIG. 1 PRIOR ART
FIG. 1 is a perspective view of a prior art (type 9005) lamp capsule 10.

It may be appreciated that the present disclosure is not limited in its application to the details of construction and the arrangement of components set forth in the following description or illustrated in the drawings. The embodiments herein may be capable of being practiced or being carried out in various ways. Also, it may be appreciated that the phraseology and terminology used herein is for the purpose of description and should not be regarded as limiting as such may be understood by one of skill in the art.

The automotive headlamp 6 disclosed herein is suitable for use on a motor vehicle, particularly in the reflector cavity for the vehicle forward lighting such as the vehicle headlamp or fog lamp (collectively be referred to herein as a vehicle headlamp) which is used to illuminate a road surface. The type of motor vehicle may include, but is not limited to, a land vehicle such as a passenger sedan, a sport utility vehicle, a minivan, a truck (light or heavy truck) and a recreational vehicle (e.g., ATV, motorcycle, snowmobile). Alternatively the motor vehicle may also include water vehicles (e.g. boats, jet-skis, personal water craft) and air vehicles (e.g. planes, helicopters).

Figure 2:
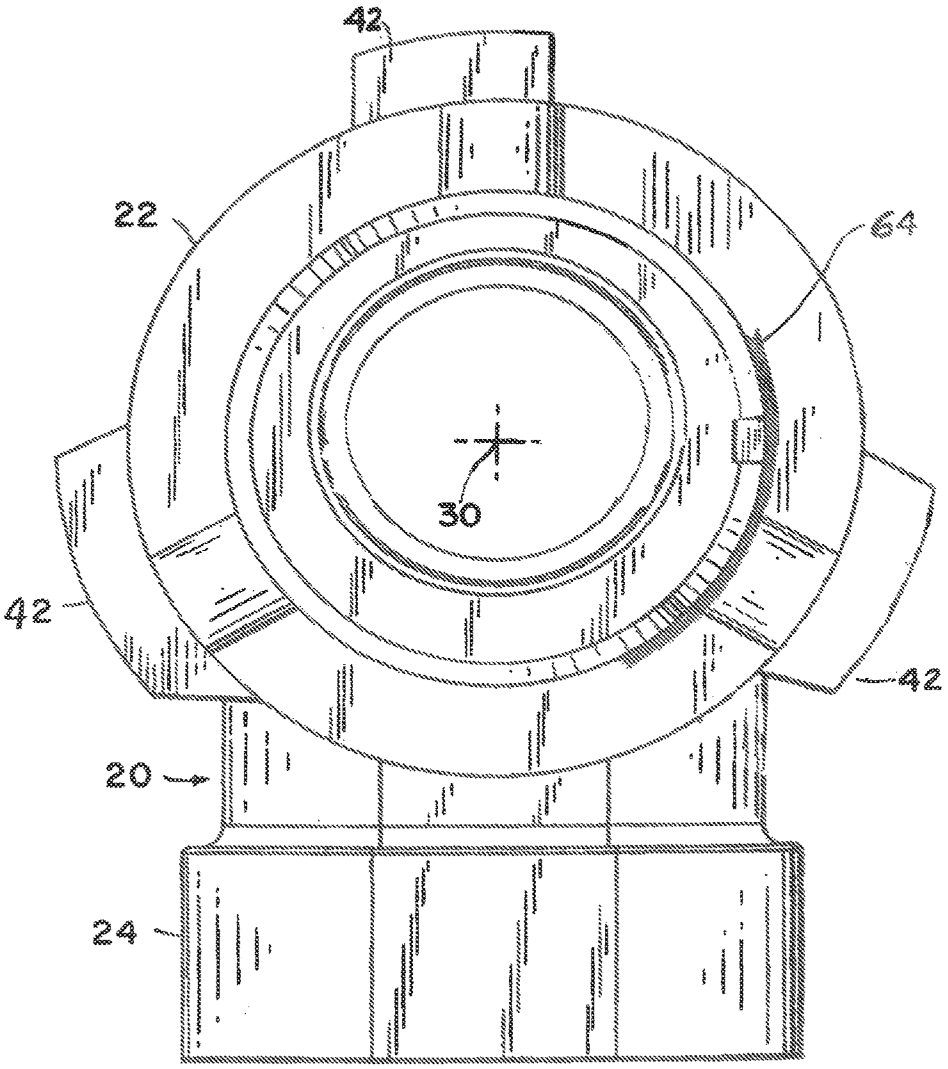
FIG. 2 PRIOR ART
FIG. 2 is a top view of prior art lamp capsule 10 of FIG. 1.
Figure 8:
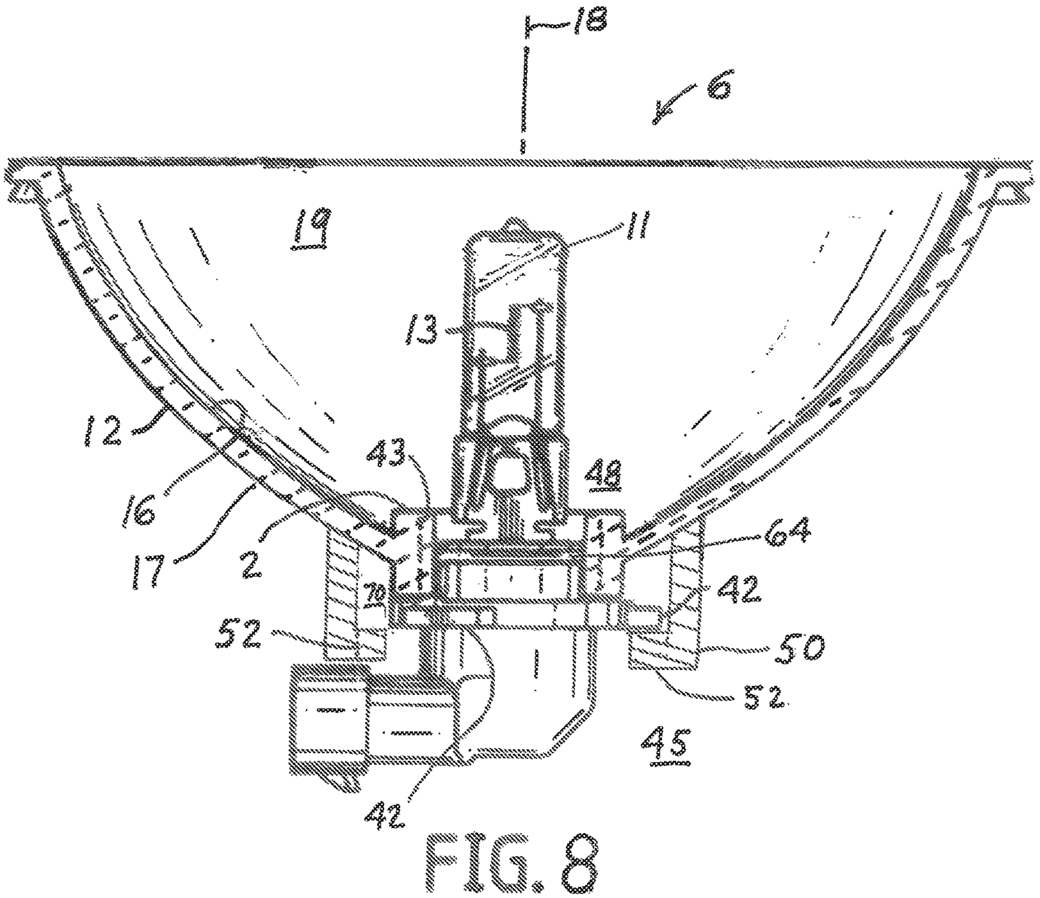
FIG. 8 is a cut-away side view of headlamp 6 having capsule 10 mounted in reflector 12.

FIG. 1 and FIG. 2 show a prior art lamp capsule 10 as known in U.S. Pat. No. 5,618,097 (Coushaine) of the present Applicant's assignee, which is incorporated by reference in its entirety as if fully set forth herein. Lamp base 20 is molded of a high temperature plastic and includes a body 22 having a keyed portion. Lamp base 20 also includes a connector portion 24. Connector portion 24 is of conventional design and may have a right angle ("L-shaped") configuration as shown. In other embodiments, connector portion 24 may have a straight configuration and be generally coaxial with the central axis of light source 11 such as the glass bulb containing filament 13 (FIG. 8). Lamp body 22 of lamp base 20 is generally circular and has a central axis 30. Retaining keys 42 extend from lamp base 20 and may have the form of radially-extending tabs or projections. Retaining keys 42 are typically molded with lamp base 20 and are located at different circumferential positions around body 22. The glass lamp bulb 11 is typically mounted on lamp base 20 using a conventional mounting structure, including a metal clamp 36 secured to a press seal portion of the bulb envelope. Electrical connections (not shown) within lamp capsule 10 are made in conventional manner. Disposed axially above retaining keys 42, there is formed in body 22 a circumferentially formed groove 60 into which a gasket, O-ring or the like 64 is inserted to provide a seal for use with lamp capsule 10 when inserted into a reflector 12. Gasket 64 is shown partly broken away to reveal groove 60. As is known in the art, gasket or O-ring 64 is formed of a resilient material such as elastomer or silicone. Lamp body 22 may also have cam surfaces 41.

Figure 9:
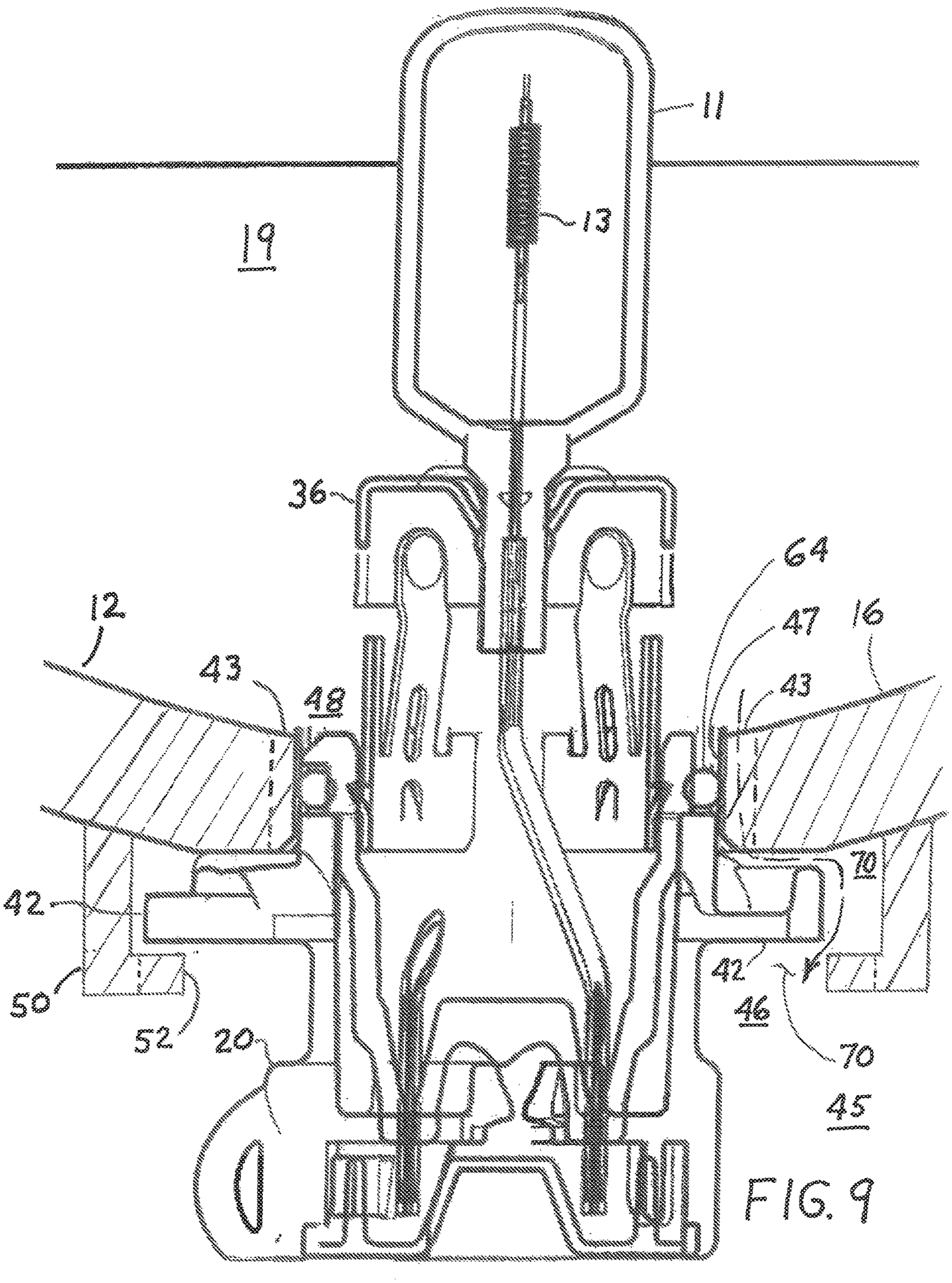
FIG. 9 is an enlarged view similar to FIG. 8 showing air passageway 70.

FIGS. 3-8 depict a headlamp reflector 12 into which a lamp capsule 10 of FIG. 1 can be operatively inserted, as shown in FIG. 8 and FIG. 9 to form headlamp 6. Reflector 12 may be made of a molded plastics material as is known in the art. Reflector 12 has the general form of a concave shell with an exterior (or rear) surface 17 and an interior, or forward reflective, side, referred to here as optical surface 16. Reflector 12 may be formed from metallized plastic to provide optical surface 16, which provides a desired headlamp beam pattern. Extending in a forward direction is an axis 18, generally serving as optical axis 18 and generally indicating the direction of the projected headlamp beam. Reflector 12 defines an inner reflector cavity 19, which may advantageously be enclosed on the front side by a clear cover lens.

Figure 3:
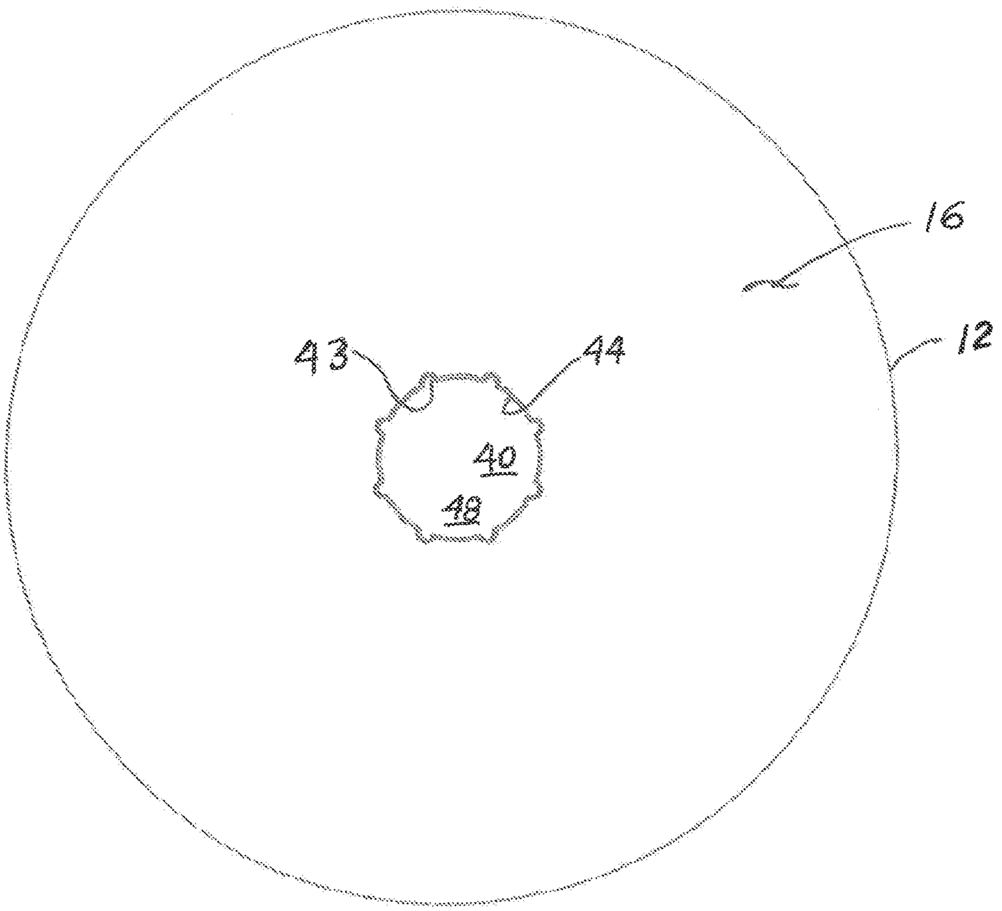
FIG. 3 is a top view of reflector 12.
Figure 4:
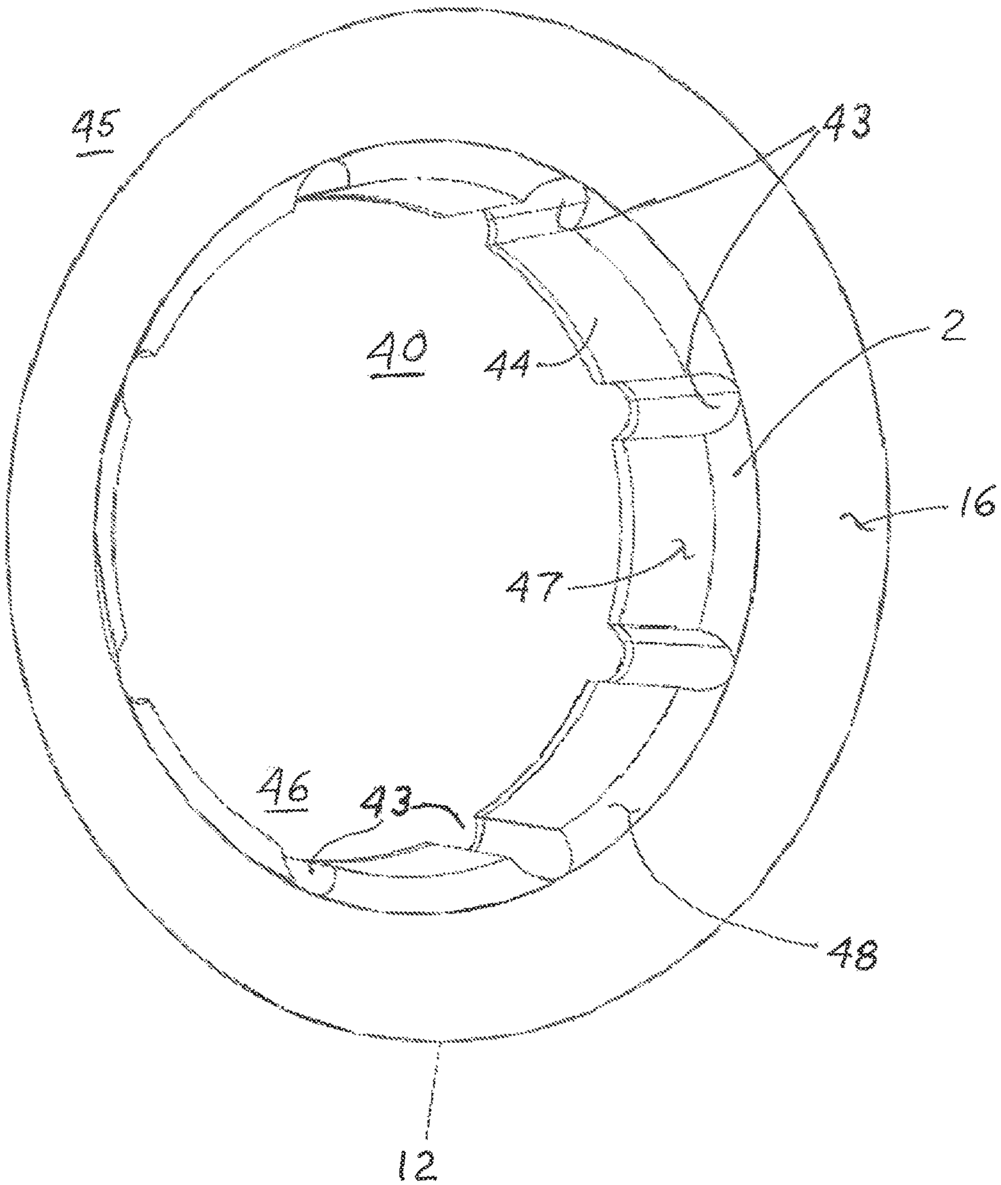
FIG. 4 is an enlarged perspective view of part of neck 2 of reflector 12.
Figure 5:
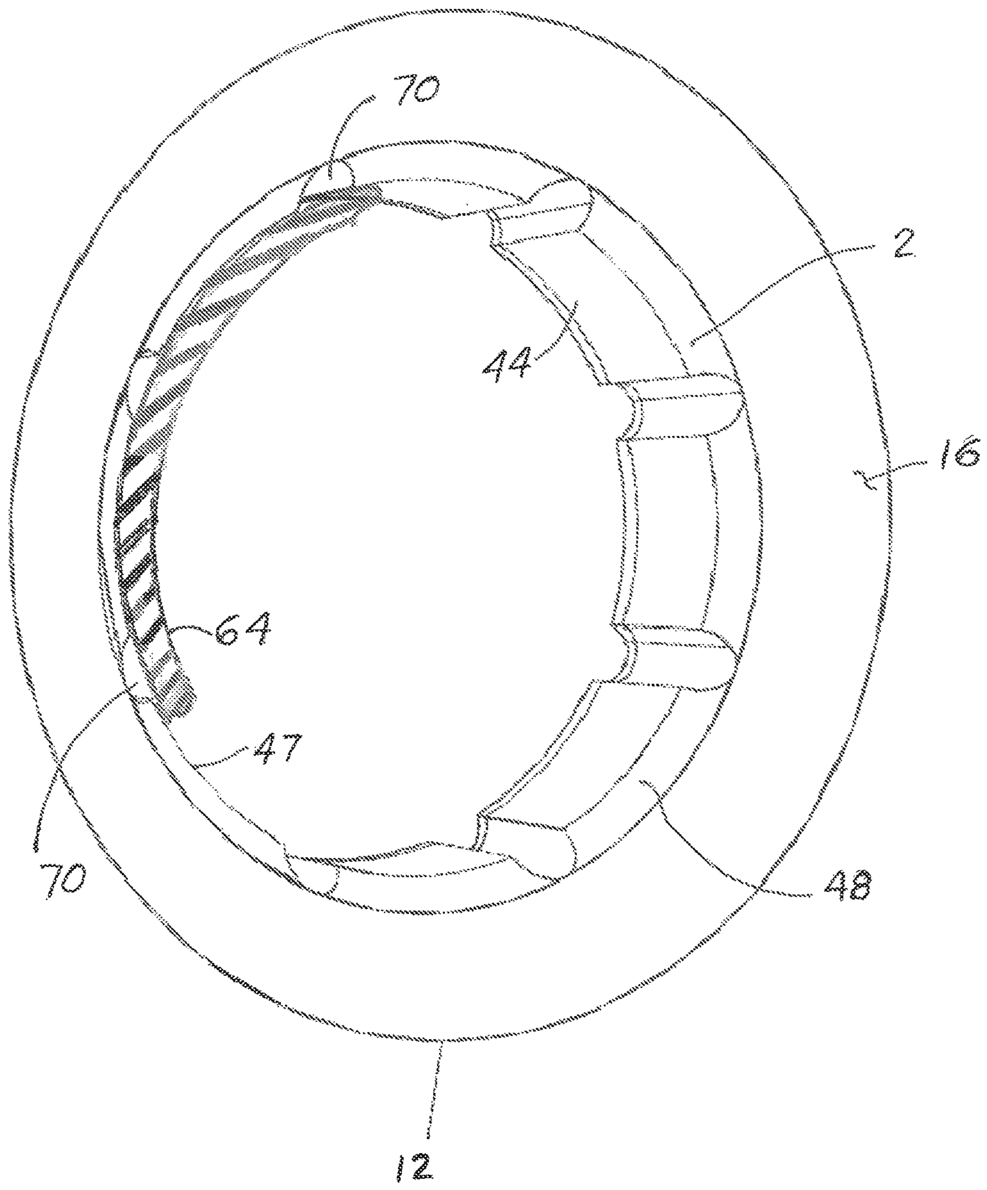
FIG. 5 is a view of FIG. 5 including a portion of gasket 64 of capsule 10.

Referring to FIGS. 3-5, it is shown in a plan or front view that reflector 12 has a neck 2 forming a bore 40. Bore 40 has one or more vents, defined by one or more channels 43. A plurality of channels 43 is preferred, such as eight (8) circumferentially spaced channels 43. Bore 40 has bore inner surface 44. Referring to perspective view in FIG. 4, bore 40, and thus inner surface 44, extends in axial direction 18 between a neck entrance 46 and a neck exit 48. Neck exit 48 merges into optical surface 16. As depicted, bore inner surface 44 is interrupted by channels 43 and forms "lands" or contact surfaces that collectively define gasket seating surface 47. In operative position with lamp capsule 10 mounted in neck 2 of reflector 12, gasket seating surface 47 contacts gasket 64 (shown in situ in operative, capsule-mounted position and partially broken away in FIG. 5) along the "lands" between channels 43, thus radially locating lamp capsule 10, and furthermore gasket 64 can "bridge" over the channels 43 so the vents are not completely closed off.

As shown in FIG. 5, channel 43 is formed by an axially extending recess extending between neck entrance region 46 and next exit region 48 or optical surface 16. Channel 43 extends across gasket 64 and forms air passageway 70 bounded in part by gasket 64. Each channel 43 in neck 2 defines an air passageway 70. As shown in FIG. 5 embodiment, it is preferred that this axially-extending channel 43 be a recess, in radial direction, into bore inner surface 44 but not pierce all the way through the wall thickness (in radial direction) above entrance region 46. In the embodiment shown in FIGS. 3-10, it is suitable that each of the eight channels 43 be recessed, i.e. in the outward radial direction as seen in top plan view in FIG. 3, about 1 mm below inner surface 44, and each channel 43 be about 6 mm in length, i.e. in the axial direction as seen in FIG. 8 or 9.

The neck entrance region 46, through which lamp capsule 10 would be inserted into reflector 12, communicates with exterior region 45 (FIGS. 4, 8) which is disposed outwardly rearward and exterior of reflector 12, and as such exterior region 45 also communicates with reflector rear surface 17. Thus, air passageways 70 communicate between neck entrance 46 and reflector cavity 19.

Figure 6:
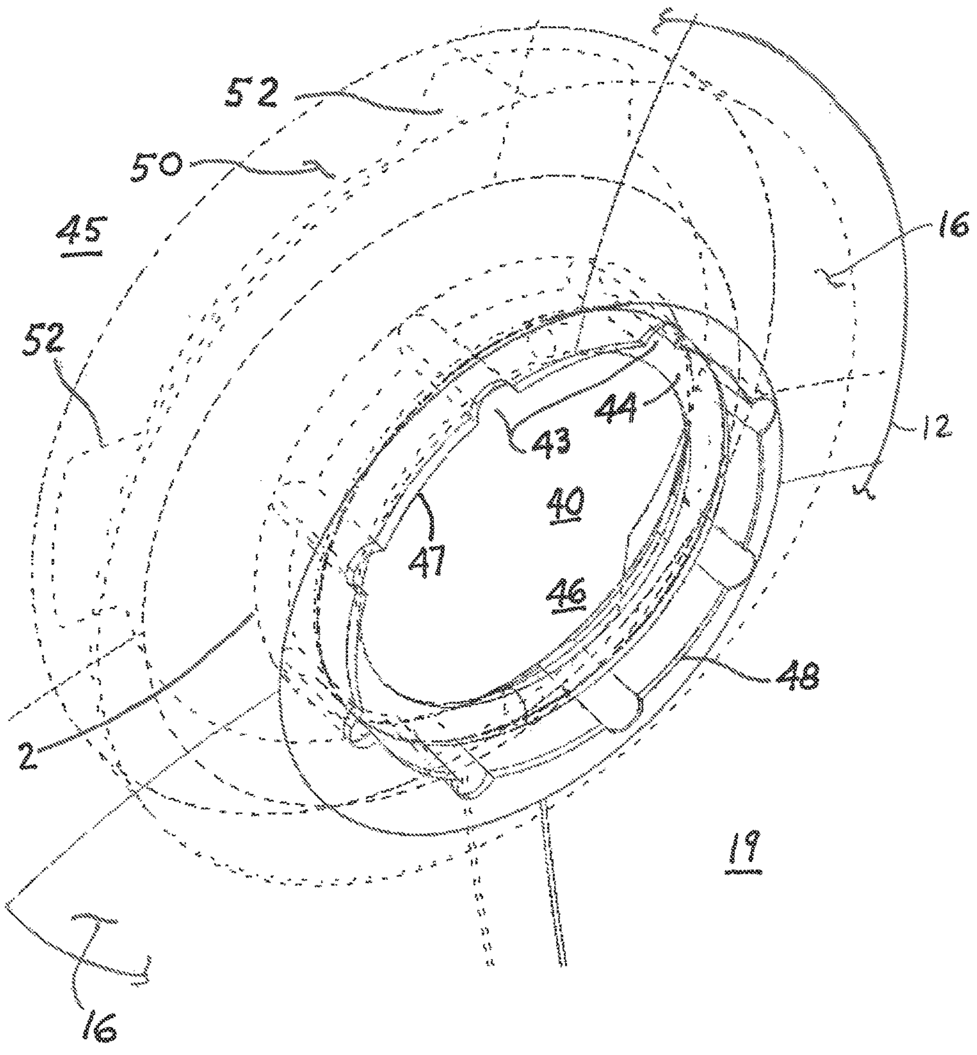
FIG. 6 is a diagrammatic perspective view of reflector 12 showing socket region 50 in phantom axially rearward of gasket seating surface 47.
Figure 7:
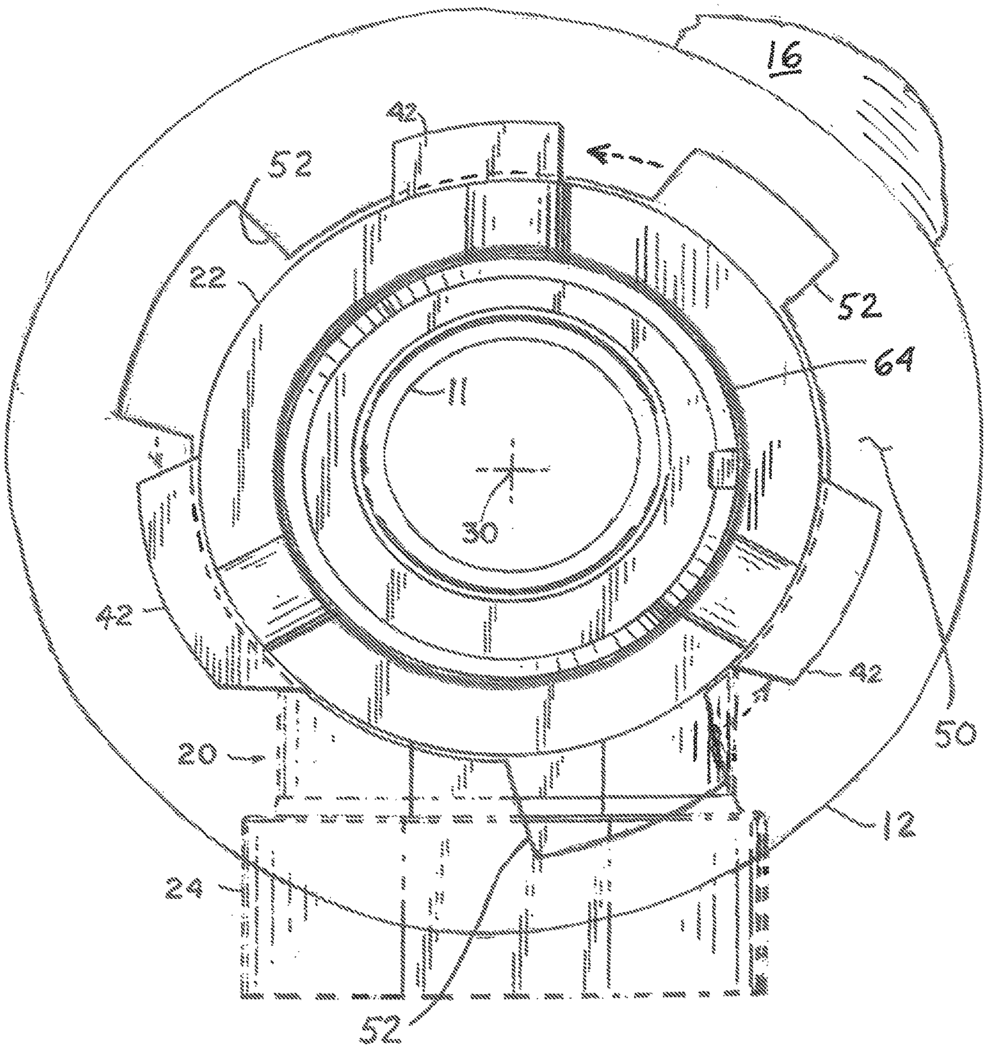
FIG. 7 is a top diagrammatic view seen at an approximate plane of latching of lamp capsule 10 in socket region 50 of FIG. 6.
Figure 12:
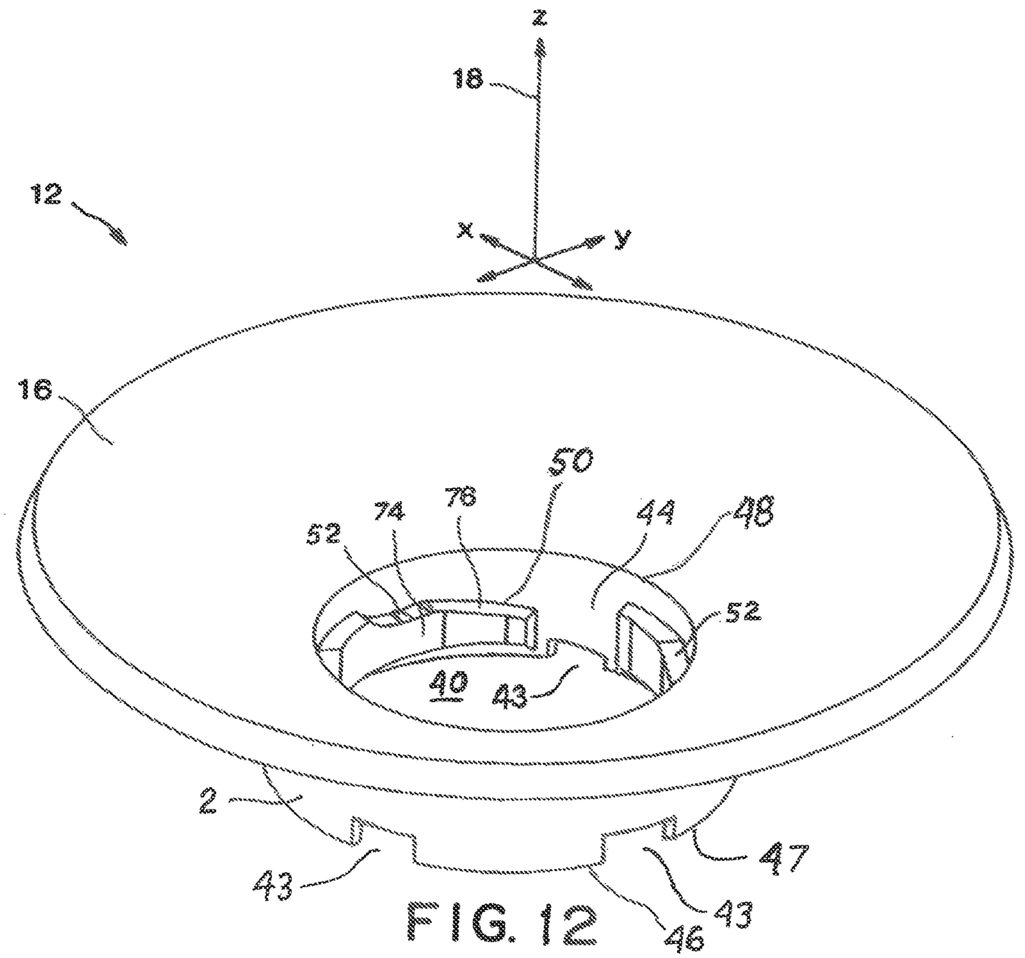
FIGS. 12 and 13 are perspective views of a reflector 12 for mounting a capsule of FIG. 11.

Referring to FIGS. 6-7 and FIG. 12, reflector 12 and neck 2 further define socket region 50 that receives and retains lamp capsule 10. Socket region 50 is located, as seen from front perspective view in FIG. 6, displaced axially rearward of gasket seating surface 47, indicated by socket region 50 being shown in dashed line. Reflector 12 and optical surface 16 are shown in cut-away. Socket region 50 has capsule latching structure 52, which provides a cavity having a ledge onto which capsule retaining keys 42 can be introduced through mating slots such as by axial and then slight rotational (so-called "eighth-turn" or "quarter-turn") motion akin to a bayonet latch, all as is known in the art. This insert, twist and lock mounting itself is conventional in the art and shown in, for example, U.S. Pat. No. 6,082,883 (Tatsumi) at FIGS. 3-4 and col. 1, ln. 10-24; or in U.S. Pat. No. 5,938,323 (McMahan) at FIG. 12, 15-16 and col. 4, ln. 51-61, each of which patent document is incorporated here in its entirety as if fully set forth herein. FIG. 7 is an interior view within socket 50, generally along an approximate plane located rearward of (below) the gasket seating surface 47. Thus, in FIG. 7, while capsule retaining keys 42 and latching structure 52 are rendered in solid line, lamp base 20 and connector portion 24 are in dashed line, since they are located further underneath socket 50. Socket 50 and latching structure 52 may be of the type generally referred to as a bayonet connection, preferably with camming surface engagement. Socket 50 with latching structure 52 having mating slots and retention features for retaining keys 42 is known in the art such as in U.S. Pat. No. 5,855,430 (Coushaine) of the present Applicant's assignee, or in U.S. Pat. No. 5,010,455 (Luallin) (assigned on its face to General Motors Corp.), or in U.S. Pat. No. 4,862,337 (Ohshio) at FIGS. 1, 3 and col. 4, ln. 22-31, col. 5, ln. 55-col. 6, ln 15, each of which patent document is incorporated here in its entirety as if fully set forth herein. Lamp capsule 10 with retaining keys 42 is introduced into the slots of latching structure 52 and rotated (shown by counterclockwise dotted arrows) onto the lands, ledges or cam features. Referring to FIG. 12, shown in closer detail, socket 50 receives retaining arms or keys 42 which, when lamp capsule 10 is inserted into reflector, each key 42 passes axially inward sufficiently to slide up on a corresponding lead-in ramp 76, formed on reflector 12. By rotating lamp capsule 10, retaining arms or keys 42 are cammed up ramps 76, thereby advancing lamp capsule 10 along optical axis 18 (z-direction) while engaging resilient gasket 64, and ramps 76 may have retaining depressions or slots at their ends, as known in the art. When thus rotated into position, axial faces of retaining keys 42 abut latching structure 52. Also, radially directed face 74 can come into register with mating face of lamp body 22 from which keys 42 extend, for radial positioning within bore 40. Alternatively or additionally, lamp capsule cam surfaces 41 (FIG. 1) can engage appropriately resilient lead-in ramps. In embodiments herein, socket 50 and latching structure 52 may be integrally molded with reflector 12 as in FIG. 12 herein or as known conventionally as described in e.g. the Coushaine U.S. Pat. No. 5,855,430 (e.g. FIG. 2 therein); or alternatively socket 50 and latching structure 52 may be provided as a component that is bolted or otherwise affixed to the rear of the reflector 12 as shown in FIG. 8 herein or as known conventionally as described in the art such as in Tatsumi U.S. Pat. No. 6,082,883 at FIG. 3 therein, as in Ohshio U.S. Pat. No. 4,862,337 at FIGS. 1, 3 therein, or in McMahan U.S. Pat. No. 5,938,323 at FIG. 12 therein.

In an alternate embodiment (not shown) and as known in the art with lamp capsules of the type SAE 9004 or 9007 having a generally straight, rather than angled, connector portion 24, but which has, similarly to the 9005-type lamp capsule 10 depicted in FIG. 1, a gasket 64 disposed axially above retaining keys 42, the latching structure 52 may take the form of a lock ring to hold lamp capsule 10 to neck 2 of reflector 12, as known in U.S. Pat. No. 5,088,011 (Williams) of the corporate predecessor (GTE Products Corp.) of the present Applicant's assignee, or in U.S. Pat. No. 4,564,891 (Daumueller) (assigned on its face to Robert Bosch GmbH), each incorporated here in their entirety as if fully set forth herein. In a further alternate embodiment (not shown) and also known in the art, capsule latching structure 52 may take the form of a spring bearing on a rearward surface of lamp body 22 and engaged in a portion of socket 50 for urging lamp capsule 20 into engagement.

Figure 10:
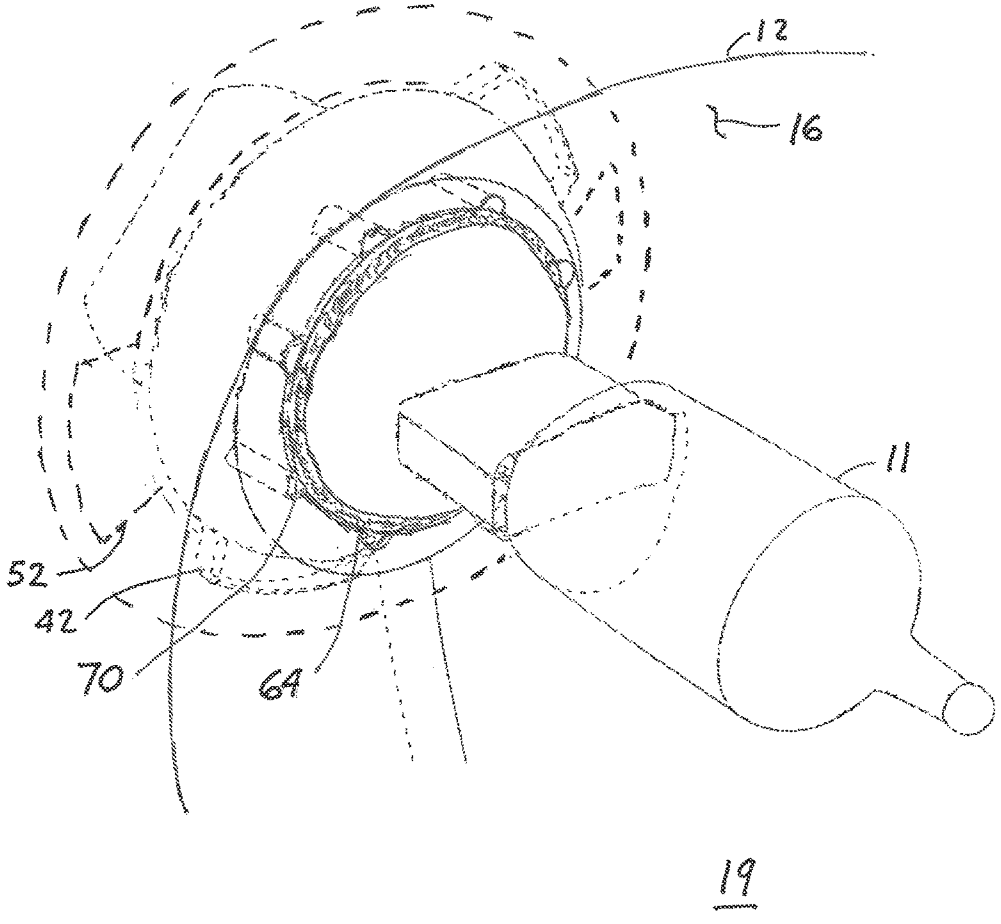
FIG. 10 is a perspective schematic view of headlamp 6 showing air passageway 70.

Referring to FIGS. 8-10, with lamp capsule 10 received in socket region 50, air passageways 70 are readily seen. Air passageway 70 is formed between confronting surfaces of recessed channel 43 and gasket 64, thereby allowing air flow between inner reflector cavity 19 and neck entrance region 46 and thus to exterior region 45. Air flow is enabled past socket 50 by gaps between lamp capsule 10 and socket 50, in particular with reference to FIG. 7 and FIG. 10, past open slots of latching structure 52 after retaining keys 42 (shown in dashed line in FIG. 10) have been rotated past the entrance slot. In FIG. 9, passageway 70 shows air flow path (with an arrow) between optical surface 16, through channel 43 of neck 2, behind gasket 64, and continuing out a slot of latching structure 52 to neck entrance region 46.

Figure 11:
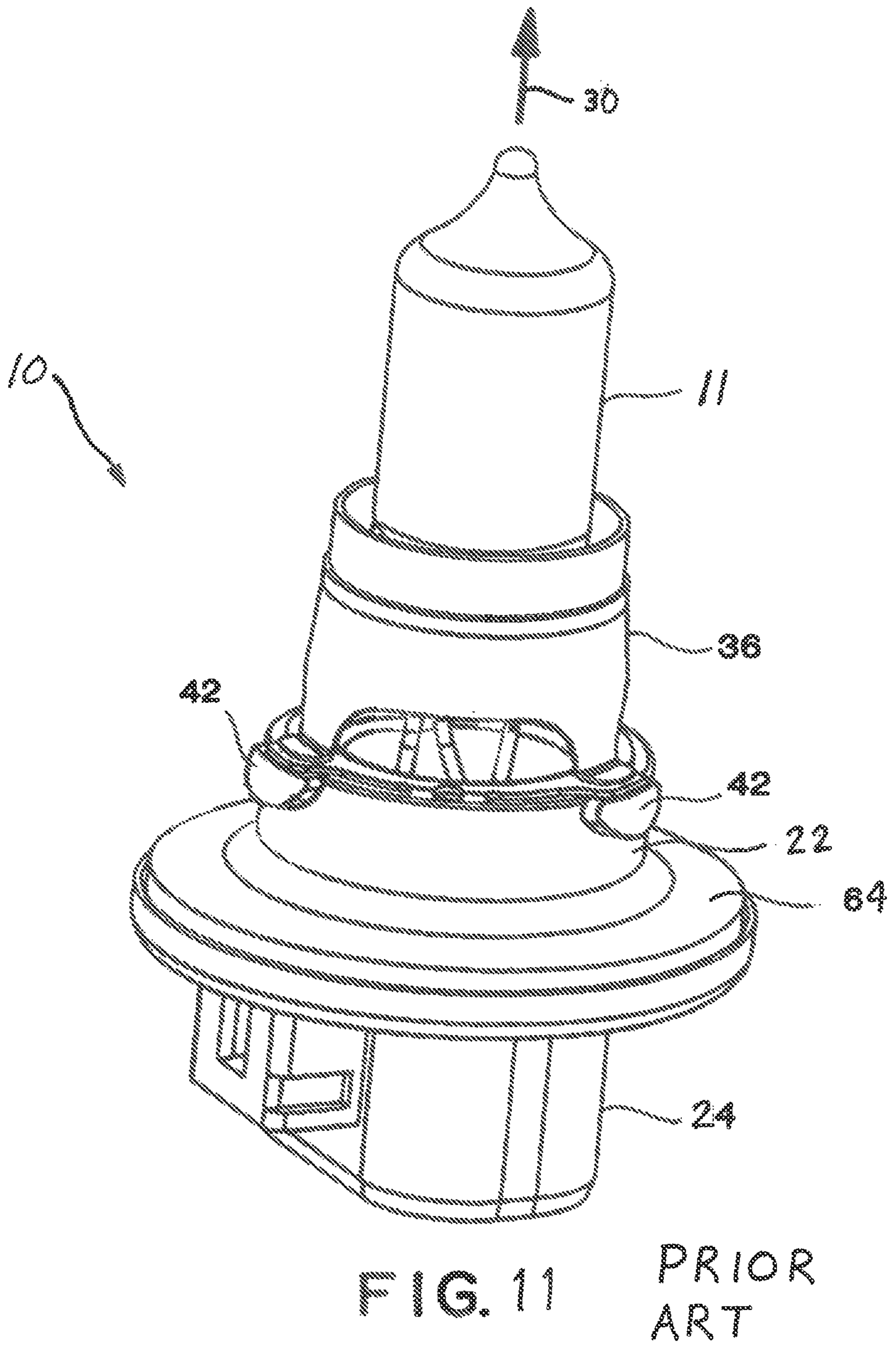
FIG. 11 PRIOR ART
FIG. 11 is a perspective view of a prior art (type 9008) lamp capsule 10.

In another embodiment of the present embodiments, FIG. 11 shows a prior art SAE type 9008 lamp capsule 10, with like reference numerals as in FIG. 1 connoting analogous structure. Differing from FIG. 1, gasket 64 is located axially downward and below retaining keys 42.

Figure 13:
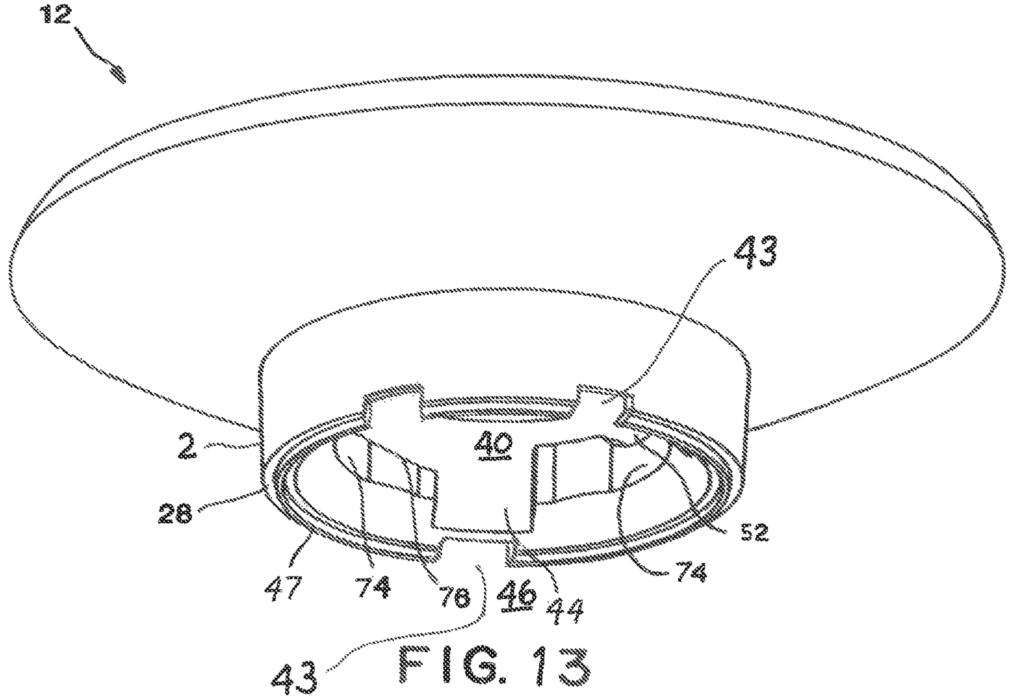
Figure 14:
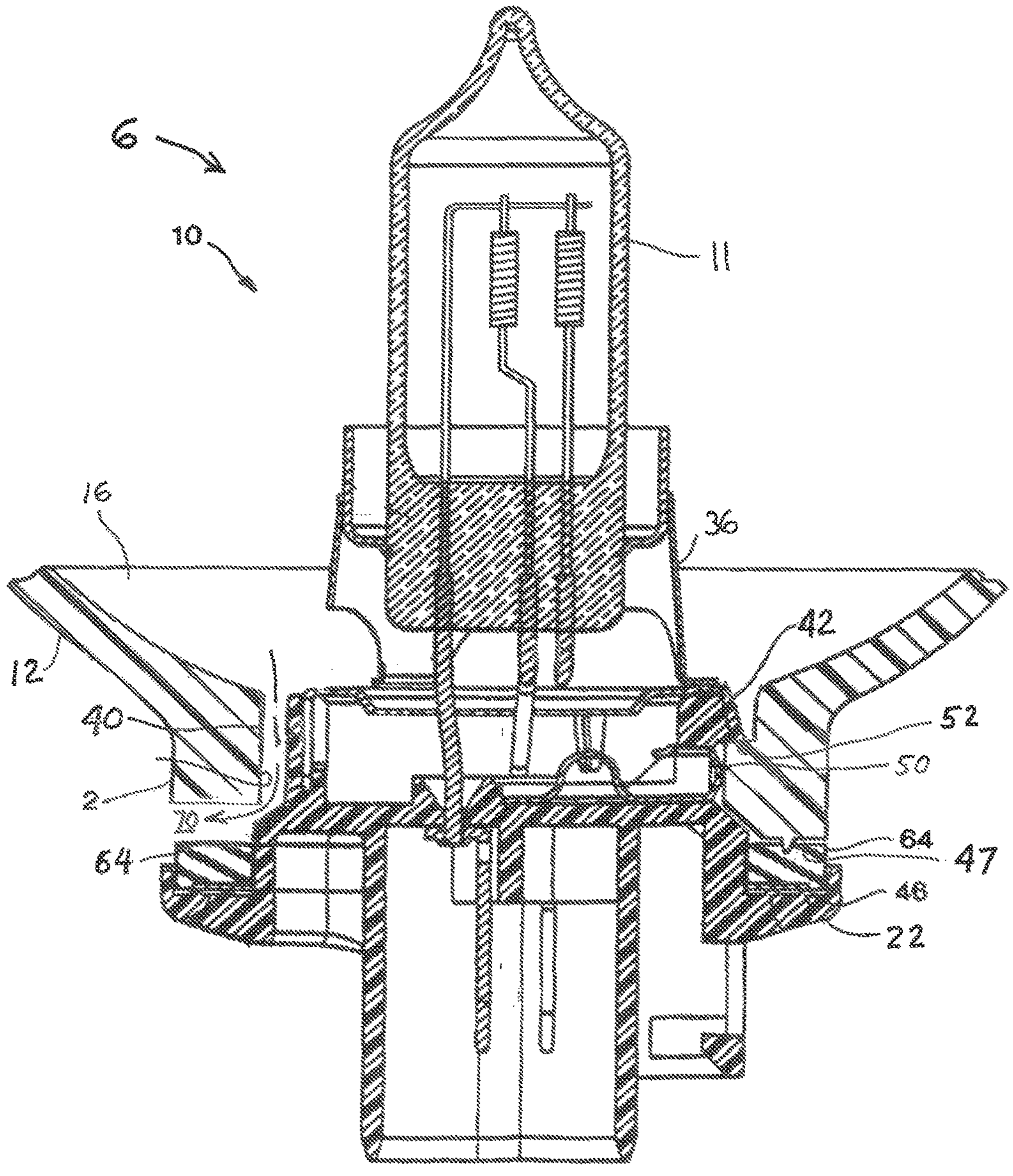
FIG. 14 is a cut-away side view of headlamp 6 having capsule 10 of FIG. 11 mounted in reflector 12.

FIGS. 12 and 13 depict a vented reflector 12 suitable for use with lamp capsule 10 of FIG. 11. Reflector 12 is the same as depicted in U.S. Pat. No. 5,855,430 (Coushaine) of the present Applicant's assignee, incorporated here in its entirety as if fully set forth herein, with the difference that channels 43 are provided in the lower peripheral rim of neck 2 at neck entrance region 46. The plurality of channels 43 result in castellations in the wall surface or lip defining gasket seating surface 47, the recesses of channels 43 being bridged by the confronting surface of gasket 64. Referring to FIG. 14, headlamp 6 resulting from lamp capsule 10 retained in socket 50 of reflector 12, shows air passageways 70 extending radially away from bore 40 or reflector axis 18.

In operation, using a lamp capsule 10 of the type generally shown, for example, in FIG. 1 assembled into headlamp 6 as in FIG. 9 and mounted in a headlamp set, it was determined by temperature measurement by thermocouple mounted on wall of bulb 11 at the location of filament 13 (hot spot), after operation for 1 hour at expected voltages typical for a vehicle (12.8 V, drawing 68 Watts; and 14 V, drawing 78.1 Watts), that observed temperatures (553 degrees C.; and 594 degrees C., respectively) were found acceptable and below maximum allowable temperature of 650 degrees C. It was further observed that the temperatures measured at a top of lamp body 22 axially above gasket 64 and at lamp body 22 axially below (rearward of) gasket 64 met temperature requirements to avoid degradation.

While a preferred embodiment of the present disclosure has been described, it should be understood that various changes, adaptations and modifications can be made therein without departing from the spirit of the disclosure and the scope of the appended claims. The scope of the disclosure should, therefore, be determined not with reference to the above description, but instead should be determined with reference to the appended claims along with their full scope of equivalents. Furthermore, it should be understood that the appended claims do not necessarily comprise the broadest scope of the disclosure which the applicant is entitled to claim, or the only manner in which the disclosure may be claimed, or that all recited features are necessary.

The following is a non-limiting list of reference numeral used in the specification:

2 reflector neck
6 headlamp
10 lamp capsule
11 bulb
12 reflector
13 bulb filament
16 inner optical surface of reflector
17 reflector rear surface
18 axis (optical)
19 inner reflector cavity
20 lamp base
22 lamp body
24 connector portion
30 lamp central axis
36 metal clamp
40 bore of neck
41 cam surface
42 retaining key
43 channel
44 bore inner surface
45 exterior region
46 neck entrance region
47 gasket seating surface
48 neck exit region
50 socket
52 capsule latching structure
60 groove
64 gasket
70 air flow passage
74 radial face
76 lead-in ramp

What is claimed is:

1. An automotive lamp reflector (12) adapted to receive an automotive lamp capsule (10) having a resilient gasket (64) and retaining keys (42) extending from a lamp base (20), the reflector (12) comprising:

a neck (2) and a reflective optical surface (16) formed thereon, the optical surface (16) defining an inner reflector cavity (19);

the neck (2) defining a bore (40) having a bore inner surface (44), the bore (40) extending in an axial direction (18) between a neck entrance region (46) and a neck exit region (48), the neck entrance region (46) sized to receive a lamp capsule (10) and facing away from the optical surface (16), the neck entrance region (46) opening to an exterior region (45) disposed outwardly exterior of the reflector (12);

the neck exit region (48) being adjacent the optical surface (16), whereby the bore (40) communicates between the inner reflector cavity (19) and the exterior region (45);

the neck further defining:

a socket region (50) adapted to receive the lamp capsule (10) when positioned in the bore (40), the socket region (50) comprising a capsule latching structure (52) adapted to retain, at an axially predetermined position, the plurality of retaining keys (42) formed on the lamp base (20) of the lamp capsule (10);

a gasket seating surface (47) axially displaced from the capsule latching structure (52) and configured to receive the lamp gasket (64) disposed on the lamp base (20) of the lamp capsule (10); and at least one channel (43) defined in the neck (2) adjacent to and recessed relative the gasket seating surface (47), said at least one channel (43) opening to the neck entrance region (46) and thereby bounding an air passageway (70) in fluid communication between the reflector cavity (19) and the neck entrance region (46), whereby when a lamp capsule (10) is received in the bore (40) with the lamp gasket (64) adjacent the gasket seating surface (47) and the retaining keys (42) of the lamp capsule (10) retained against the capsule latching structure (52) in the socket region (50), the air passageway (70) defined in the neck (2) permits communication of air between the optical surface (16) and neck entrance region (46).

2. The lamp reflector of claim 1, wherein the at least one channel (43) is formed as a recess in the neck (2).

3. The lamp reflector of claim 1, wherein the gasket seating surface (47) is defined along the bore inner surface (44) and the at least one channel (43) is defined by at least one axially extending recess along the bore inner surface (44) extending between the neck entrance region (46) and the optical surface (16).

4. The lamp reflector of claim 3, wherein the at least one channel (43) is recessed outwardly radially away from a reflector longitudinal axis (18).

5. The lamp reflector of claim 1, wherein the gasket seating surface (47) is defined at the neck entrance region (46) and the at least one channel (43) is recessed below a peripheral lip of the neck entrance region (46).

6. The lamp reflector of claim 1, wherein the bore inner surface (44) is cylindrical.

7. The lamp reflector of claim 1, wherein the at least one channel (43) comprises a plurality of channels (43) thereby defining a plurality of air passageways (70).

8. The lamp reflector of claim 1, wherein the capsule latching structure (52) comprises a plurality of lamp-retaining slots.

9. The lamp reflector of claim 8, wherein the lamp-retaining slots are of the bayonet type, whereby rotation of the lamp capsule (10) brings the retaining keys (42) into engagement with the capsule latching structure (52).

10. The lamp reflector of claim 8, wherein the lamp-retaining slots extend at least partially transverse the bore (40), whereby rotation of the lamp capsule (10) brings the retaining keys (42) into retention with the lamp-retaining slots.

11. The lamp reflector of claim 1 in combination with the lamp capsule (10), whereby when the lamp capsule (10) is disposed in the bore (40) and the retaining keys (42) are engaged in the latching structure (52), the at least one channel (43) defines the air passageway (70) between an outwardly facing surface of the gasket (64) and the gasket seating surface (47).

12. An automotive headlamp (6) comprising a lamp reflector (12) in combination with an automotive lamp capsule (10), comprising the reflector (12) defining an inner surface (16) and a neck (2) having a bore (40) extending between the reflector inner surface (16) and a neck entrance region (46) and defining a capsule-receiving region, the neck (2) further defining a capsule latching structure (52), the neck entrance region (46) being in communication with an exterior region (45) disposed outwardly exterior of the reflector (12);

the lamp capsule (10) comprising a lamp base (20) on which is mounted a light source (11) and a gasket (64), wherein the lamp base (20) is latched in the capsule-receiving region, the light source (11) is disposed in optical association with the reflector inner surface (16), and the gasket (64) is seated in register with the neck (2) at a gasket seating surface (47) of the neck (2); and the neck (2) further defining in the gasket seating surface (47) at least one air flow channel (43) extending across and bounded by the gasket (64) and thereby defining an air passageway (70) in communication between the reflector inner surface (16) and the exterior region (45).

13. The headlamp of claim 12, wherein the gasket (64) is disposed on an inner surface (44) of the bore (40).

14. The headlamp of claim 13, wherein the at least one channel (43) is recessed radially outward of the bore inner surface (44).

15. The headlamp of claim 12, wherein the gasket (64) is received on an outer peripheral surface of the bore (40) adjacent the neck entrance region (46).

16. The headlamp of claim 15, wherein the outer peripheral surface of the bore (40) is oriented facing axially downward.

17. The headlamp of claim 12, wherein the lamp capsule (10) further comprises a plurality of retaining keys (42) received in an associated plurality of slots of the capsule latching structure (52).

* * * * *